Aug. 17, 1965
R. A. KENNEDY
3,200,519
POWERED HAND SHOVEL
Filed April 11, 1963
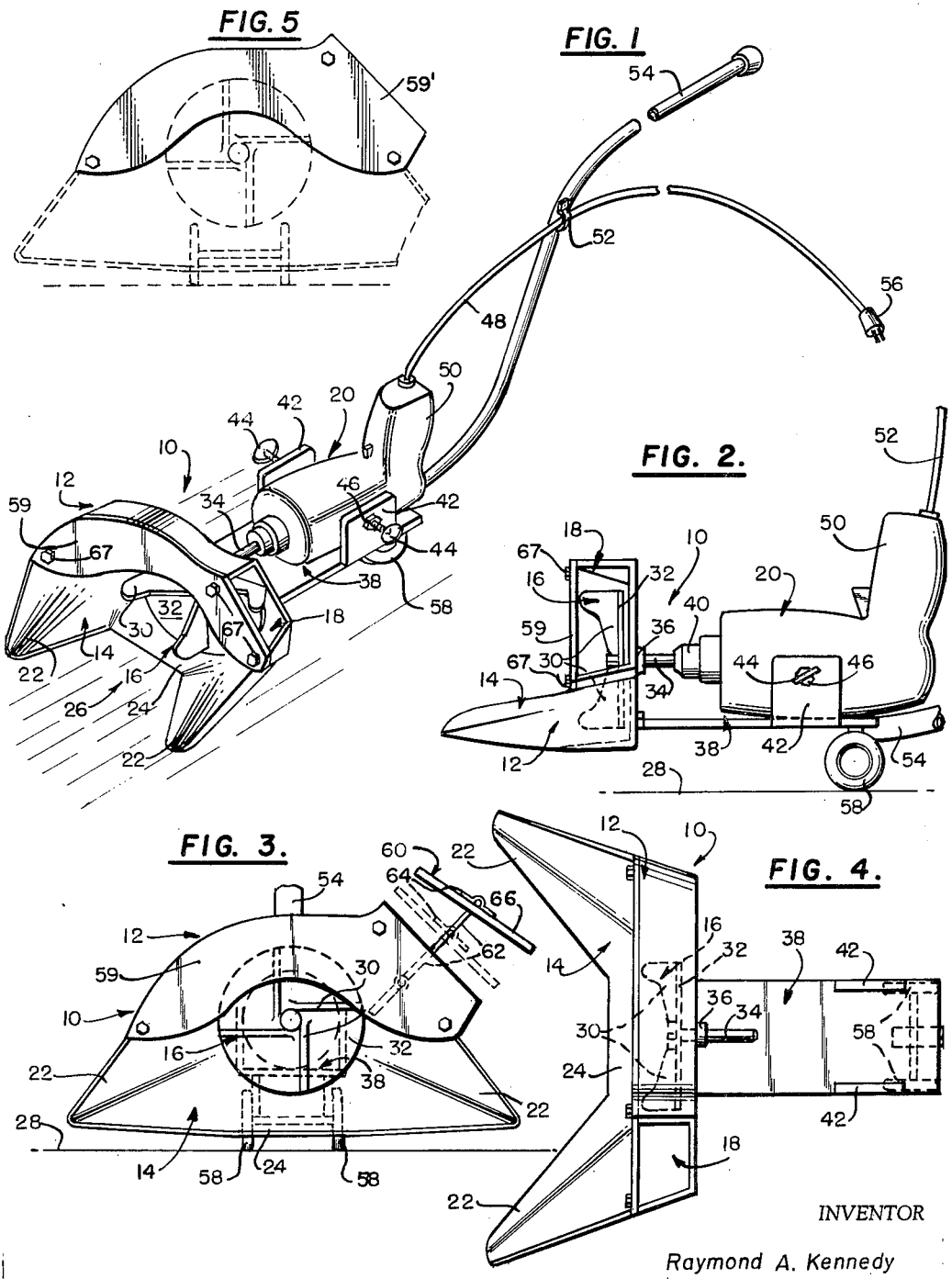
INVENTOR
Raymond A. Kennedy
BY *Kimmel & Crowell*
ATTORNEYS

United States Patent Office 3,200,519
Patented Aug. 17, 1965

3,200,519
POWERED HAND SHOVEL
Raymond A. Kennedy, P.O. Box 816, Sioux City, Iowa
Filed Apr. 11, 1963, Ser. No. 272,362
5 Claims. (Cl. 37—43)

This invention relates to a hand shovel or powered blower and relates more particularly to a hand shovel having motorized means in association therewith to pick up a material such as snow, grain, dirt, sand or the like, from a surface and move or throw the same a greater or lesser distance to re-deposit it in a desired location.

A primary object of this invention is the provision of a device of the type described which is lightweight, self-contained, easily stored, and inexpensive and which will do work comparable to the larger, more complicated and expensive structures currently in use.

Another object of this invention is the provision of a hand shovel powered by a motor as small as one-quarter horsepower and yet capable of throwing snow or the like over 20 feet from where it is picked up.

A further object of the instant invention is the provision of a powered hand shovel which will readily accommodate any conventional motorized hand drill, either cordless or with a cord, and use the same as a drive means.

Yet another object of this invention is to provide a powered hand shovel having a housing with forward portions thereof forming a scoop means, an impeller means rotatably secured within the housing rearwardly of the scoop means, an exhaust opening defined in the housing tangentially to the impeller means and any of a variety of drive means for rotating the impeller means.

A further object of this invention is to provide a device of the type described which is balanced on a rollable supporting means for great maneuverability and ease of movement.

Other and further objects reside in the combination of elements, arrangement of parts, and features of construction.

Still other objects will in part be obvious and in part be pointed out as the description of the invention proceeds and as shown in the accompanying drawing wherein:

FIGURE 1 is a perspective view of a powered hand shovel in accordance with the instant invention, showing a motorized hand drill carried thereby as a drive means, with parts broken away for illustrative convenience;

FIGURE 2 is a side elevational view of the device as shown in FIGURE 1, with certain hidden parts being shown in dotted lines, and with parts broken away;

FIGURE 3 is an enlarged front elevational view of the powered hand shovel of the instant invention, with certain hidden parts and with an adjusted position of a deflecting means being shown in dotted lines;

FIGURE 4 is an enlarged top plan view thereof with certain hidden parts being shown in dotted lines and with the drive means removed, parts being broken away; and FIGURE 5 shows an extra shield with flattish bottom edge.

Like reference characters refer to like parts throughout the several views of the drawing.

Referring now to the drawing, the powered hand shovel of the instant invention is generally designated by the reference numeral 10 and comprises basically a housing 12 having forwardly disposed portions thereof defining a scoop means 14, an impeller means 16 rotatably secured within the housing 12 rearwardly of the scoop means 14, an exhaust material opening 18 defined in the housing 12 tangentially to the impeller means 16, and drive means 20 for rotating the impeller means 16.

The scoop means 14 is preferably comprised of a pair of forwardly extending upwardly and outwardly slanted arm members 22 and a rearwardly disposed upwardly slanting base member 24 together defining a pocket or scoop 26 into which is received the snow or other material (not shown) to be removed from the supporting surface 28.

The impeller means 16 includes a plurality of forwardly extending, circumferentially spaced, somewhat radial blade members 30 fixed to a propeller 32 and having a shaft member 34 extending rearwardly through the housing 12 and rotatably supported therein by a bearing means 36.

The drive means 20 may be of any conventional form and may include a small motor (not shown) secured to the shaft member 34 and integrally or removably supported or carried in a desired longitudinal position by a platform means 38. Preferably, the platform means 38 is constructed to accommodate and removably hold a conventional motorized hand drill such as shown in FIGURES 1 and 2 having an adjustable chuck means 40 securable to the shaft member 34 of the impeller means 16 in a well-known manner. To this end, the platform means 38 has a pair of upstanding bracket means 42 with adjustable securing means 44 comprising wing bolts threadably received in the bracket means 42 and lock nuts 46 to fixedly secure the wing bolts in adjusted position. The forward ends of the wing bolts may have any conventional means for engaging the hand drill drive means 20 and removably securing the same in operative relationship to the shaft 34 of the impeller means 16. For example, they may be provided with curved bearing members or an adjustable strap member (not shown) or may simply be sharpened or pointed or alternately may be received in apertures or openings conventionally present on opposite sides of small hand drills for removably attaching an additional handle means thereto. These are all well known and conventional per se and, therefore, they are not here illustrated.

The hand drill drive means 20 is shown as having a conventional electric cord 48 passing from the base of its grip portion 50 through a spring clip 52 secured to an elongated handle member 54 and having a pronged plug means 56 at its opposite end for operative engagement with a remote source of electrical power. The platform means 38 may readily accommodate a conventional cordless electric hand drill if the use of such a drive means were desired.

The platform means 38 is preferably supported adjacent its rear on a plurality of roller means 58 to allow the powered hand shovel 10 to be readily moved on the general supporting surface 28. When the handle member 54 is tilted backwardly the scoop means 14 is lifted from planar engagement with the suporting surface 28 as shown in FIGURES 2 and 3, and the shovel 10 may be readily moved in non-operative relationship, and when the handle member 54 is tilted forwardly as in FIGURE 1, the planar bottom of the leading bottom portion of the scoop means 14 uniformly engages the supporting surface 28 to direct the snow or other material thereon upwardly and into the impeller means 16 for removal through the exhaust opening 18 and relocation to a position more or less remote from hand shovel 10. It is to be understood that any conventional rollable support may be provided for the platform means 38 such as a caster wheel, an adjustable tricycle undercarriage similar to a vacuum cleaner, or the like. These supports are well known per se and are not here illustrated.

A downwardly projecting shield member 59 may be fixed to and form an integral part of the housing 12, or it may be a separate member of desired shape removably fixed to the housing. With the scoop means 14 a selected shape shield defines a relatively small inlet opening communicating with the impeller means 16. The size of this inlet opening may be rendered adjustable in any obvious fashion, as by using a desired shaped series of separate shields, one of which is shown in FIG. 5. This latter shield 59' has an identical upper shape of 59 of FIG. 3, but its lower edge is flatter than that of FIG. 3, and thus, admits less fluid or material thereunder. This controlled front opening provides a vacuum effect to pull the material to be shovelled, such as the snow or the like, into the impeller means 16. This small, or controlled, opening is also important because it limits the volume of material reaching the impeller means 16 thereby preventing stalling or overworking of the power means 20. The impeller means 16 draws the material through the controlled opening and pumps the same out of the exhaust opening 18 in small, but continuous, amounts similar to a centrifugal pump. Material such as ice is pulverized and then pumped through the exhaust opening 18.

An adjustable discharge deflector means such as shown in dotted lines at 60 in FIGURE 3 may be secured in any conventional manner to the housing 12, such as by an upstanding angular ended rod member 62 pivotally secured by strap means 64 to either the upper or lower surface of the material direction deflector member 66 so that the user or operator of the powered shovel 10 may readily determine where the material thrown by the impeller means 16 through the exhaust opening 18 will be directed.

It will now be seen that there is herein provided an improved powered hand shovel which satisfies all the objectives of the instant invention and others, including many advantages of great practical utility and commercial importance.

Since many embodiments may be made of the instant inventive concept and since many modifications may be made of the embodiments hereinbefore shown and described, it is to be understood that all matter herein is to be interpreted merely as illustrative and not in a limiting sense.

I claim:
1. A powered material mover unit comprising
 a substantially horizontal plate like platform having a longitudinal axis as seen in plan corresponding to the normal forward direction of use movement of said unit,
 means to rollably support said platform above a general surface, said means mounted upon and below the rear end of said platform,
 a handle member horizontally secured to the platform and adjacent said rollable support means and rising rearwardly thereabove in sweeping curves and terminating at a convenient hand height of an operator,
 a housing of generally horizontal axis and frusto-conical shape diverging in a forward direction and having one rear frustrum plane portion which is mounted vertically to the forward end of said platform and extending both above and below said plate,
 the forward part of said housing having at its lower portion a pair of slanting arms extending outwardly, downwardly and forwardly and a forwardly and downwardly slanting planar base merging with and between said pair of arms,
 the extreme bottom of said arms and said base terminating in a single slightly upwardly and forwardly horizontal plane so as to closely fit said general surface when the unit is tilted in use by upward movement of said handle,
 a vertically downwardly projecting planar shield member mounted across the upper portion of the forward part of said housing, the lower edge of said shield being concave as viewed from below at a point adjacent a forward extension of the axis of said platform, the areas below the shield member and between said arms and above said planar base collectively forming a material inlet opening,
 and a material exhaust opening defined in an upper quadrant of said housing as viewed from the front of the unit and extending from said rear frustrum plane to said forward planar shield of said housing to discharge material fed thereto from said material inlet opening upon forward movement of the unit when in use.

2. The structure of claim 1 and including
 opposed bracket means upstanding from a rear part of said platform,
 an encased electrical prime mover having a power switch in operative connection with a rearwardly directed and positioned power supply cord, the prime mover also having a forwardly directed horizontal power takeoff shaft oriented in a vertical plane passing through the said longitudinal axis of said platform, said shaft terminating with an adjustable chuck means at its forward end,
 means cooperating with said brackets and the case of said prime mover to fixedly clamp the prime mover in a selected longitudinal position with respect to said platform,
 and horizontal axis impeller means with blades within said housing between said inlet and exhaust, and including a stubshaft journalled in and through said rear frustrum plane of said housing, said stubshaft coaxially aligned with said power takeoff shaft and said chuck and being of such length in the running position of the impeller as to be adjustably gripped within said chuck,
 the said prime mover being so longitudinally selectively positioned on said platform by said clamp means upon assembly of said platform, handle, power cord, housing and impeller means, that the whole unit is forwardly and rearwardly substantially weight balanced with respect to said rollable support means as an aid in better maneuverability and accuracy and ease of movement.

3. The structure of claim 2 wherein said impeller means includes a solid circular disc between said blades and said stub shaft,
 the blades are mounted tangent to a central base circle on the disc and directed one way only from the point of tangency to the disc periphery,
 each blade is perpendicularly outstanding from the disc, the maximum position of such outstanding being somewhat inward from the periphery of the disc and of decreasing extent both inward and outward of said maximum position,
 the side profile of each blade edge immediately inward of said maximum position being of greater constant slope than the constant slope of the remaining inwardly directed edge.

4. The structure of claim 2 and additionally
 means for adjusting the size of the inlet opening, and
 means attachable to said housing for separately adjusting the size of the exhaust opening.

5. The structure of claim 2 wherein said electrical prime mover is a motorized hand drill with pistol grip and pull trigger switch, positioned with the power takeoff shaft in a horizontal position and with the pistol grip oriented upwardly so as to expose the switch from above, and the adjustable coaxial chuck means is a chuck which is also adapted to secure a working tool such as a drill.

References Cited by the Examiner

UNITED STATES PATENTS

| | | | |
|---|---|---|---|
| 1,406,897 | 2/22 | Rittenhouse | 37—43 |
| 2,281,289 | 4/42 | Hewitt | 37—43 |
| 2,695,071 | 11/54 | Hupp. | |
| 2,770,893 | 11/56 | Jacobs | 37—43 |
| 2,827,714 | 3/58 | Hyde | 37—43 |
| 2,889,641 | 6/59 | Rechenberg | 37—53 X |
| 3,017,733 | 1/62 | Evans | 56—25.4 |

FOREIGN PATENTS 668,380  6/61  Canada.

ABRAHAM G. STONE, *Primary Examiner.*

BENJAMIN HERSH, *Examiner.*